United States Patent
Cousins et al.

(10) Patent No.: US 6,338,260 B1
(45) Date of Patent: Jan. 15, 2002

(54) LOCKING DEVICE FOR MOTORCYCLE SADDLE BAGS

(76) Inventors: Donald W. Cousins; Cathy I. Cousins, both of 1510 Blair Ave., NW., Warren, OH (US) 44483

(*) Notice: Subject to any disclaimer, the term of this patent is extended or adjusted under 35 U.S.C. 154(b) by 0 days.

(21) Appl. No.: 09/499,279

(22) Filed: Feb. 7, 2000

(51) Int. Cl.[7] .............. B62J 9/00; E05B 65/48
(52) U.S. Cl. .......... 70/2; 70/64; 70/74; 70/159; 70/164; 190/120; 190/121; 224/439; 292/281
(58) Field of Search ............ 70/2–13, 63, 64, 70/69–76, 159, 164; 292/281; 190/101, 102, 119–121; 224/435, 439

(56) References Cited

U.S. PATENT DOCUMENTS

| | | | | |
|---|---|---|---|---|
| 246,503 A | * | 8/1881 | Haslett | |
| 1,403,253 A | * | 1/1922 | Knapp | 70/18 |
| 1,421,776 A | * | 7/1922 | Saunders | 70/164 |
| 1,664,432 A | * | 4/1928 | Ritter, Jr. | 70/73 |
| 2,423,003 A | | 6/1947 | Buegeleisen | 224/32 |
| 2,527,433 A | | 10/1950 | Rochelle | 224/32 |
| 4,067,422 A | * | 1/1978 | Eberte | 190/41 R |
| 4,100,775 A | * | 7/1978 | Bako | 70/70 X |
| 4,258,869 A | | 3/1981 | Hilgendorff | 224/32 A |
| 5,114,060 A | * | 5/1992 | Boyer | 224/32 R |
| 6,223,960 B1 | * | 5/2001 | Powell et al. | 224/429 |

* cited by examiner

Primary Examiner—Lloyd A. Gall
(74) Attorney, Agent, or Firm—Harpman & Harpman

(57) ABSTRACT

A device to prevent unauthorized access to motorcycle saddle bags by inserting a lockable closure insert within the bag. A hinge closure is secured within the opening of a leather type saddle bag with a separate attachment hasp fitting engageable on the opposing bag wall. The locking device is covered by the bag closure flap for decorative and accessibility reasons.

6 Claims, 3 Drawing Sheets

LOCKING DEVICE FOR MOTORCYCLE SADDLE BAGS

BACKGROUND OF THE INVENTION

1. Technical Field

This device relates to motorcycle accessories mounting saddle bag which provide storage compartments that are positioned over the rear wheel of the motorcycle. Saddle bags of this type can be of leather with a mounting frame for attachment to one another and the motorcycle or alternately rigid hard shell saddle bag enclosures formed of synthetic resin materials or the like.

2. Description of Prior Art

Prior art devices of this type are directed to motorcycle saddle bags that are typically made of leather with an internal reinforcing mounting frame. The saddle bags have a main storage area with a flap lid that is secured thereover by leather straps and interengagement buckles positioned on the bag surface. Locking saddle bags can be seen in U.S. Pat. Nos. 4,258,869, 2,527,433 and 2,423,003.

In U.S. Pat. No. 4,258,869 a saddle pack is disclosed having a pair of side housing interconnected by a support web. This device has a zipper inner closure flap and an over flap to provide a secondary or sub-compartment therebetween.

U.S. Pat. No. 2,527,433 is directed to a motorcycle saddle carrier formed of metal defining a pair of oppositely disposed storage compartments. Each compartment has a hinge lid that is contoured to match the compartment shape so as to provide a continuation of same.

U.S. Pat. No. 2,423,003 discloses a motorcycle saddle bag that is lockable. The bag has a rigid mounting plate that is secured to the fender of the motorcycle with a lock engagement portion extending therefrom. This is arranged to lock the bag to the support bracket by use of a pad lock engageable through a lock engagement portion, all within the confines of the bag.

SUMMARY OF THE INVENTION

A lockable accessory device for motorcycle saddle bags that provides a secure closure for the bag within the access opening. The locking device has a hinged rigid lid that is selectively engageable with a lock bracket secured to the bag and uses a padlock to secure the hinged lid in place. The bag's original closure flaps overlies the locking device concealing same before access.

DESCRIPTION OF THE PREFERRED EMBODIMENT

Figure 1:
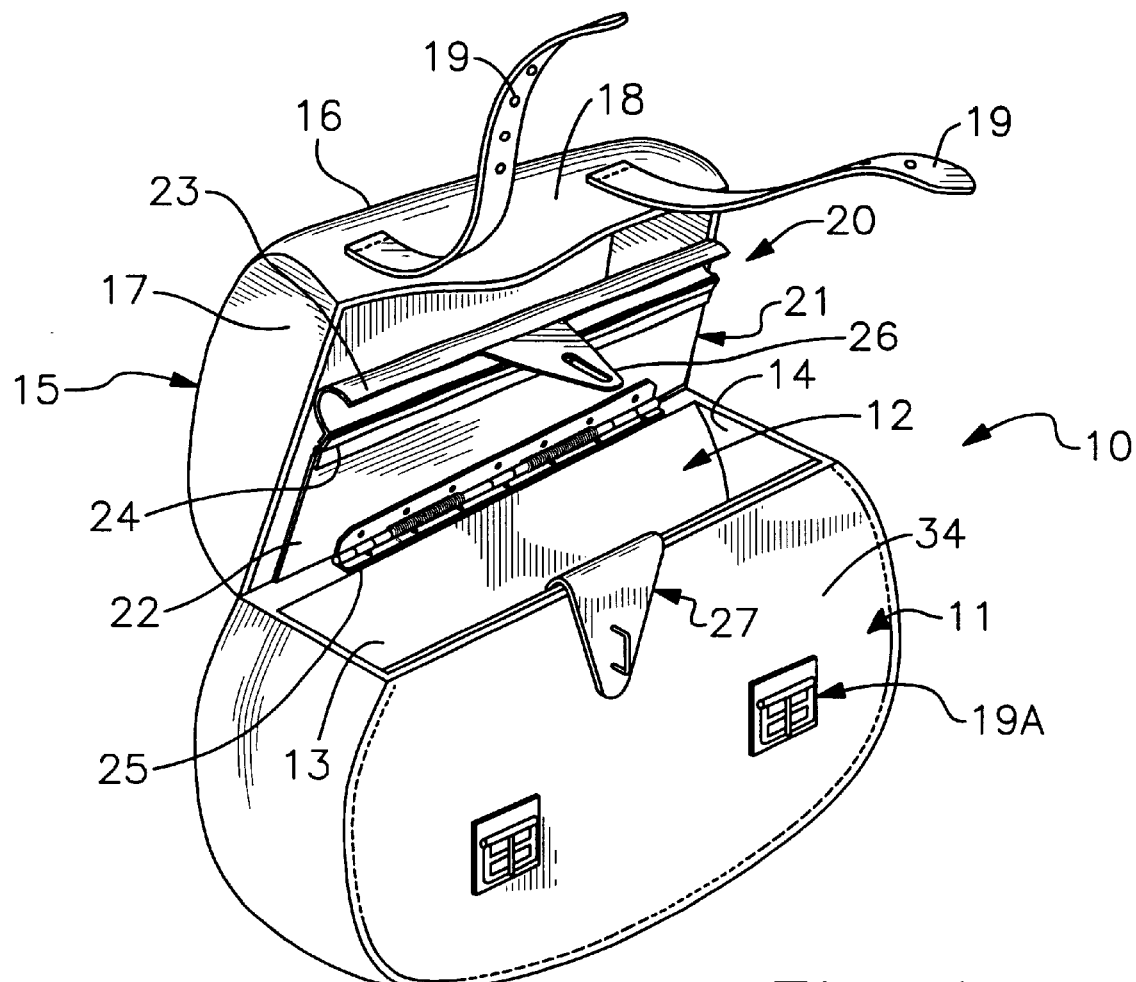
FIG. 1 is a perspective view of a saddle bag with locking device installed within.

Referring to FIG. 1 of the drawings, a motorcycle saddle bag 10 can be seen having a main leather body 11 defining an enclosure 12 within, a support and mounting frame 13 is secured within the enclosure 12 defining a rectangular opening at 14. A flexible closure flap 15 extends from the main body member 11 in a hinged relation thereto as will be well understood by those skilled in the art. The closure flap 15 has a top portion 16, integral sidewalls 17 and a front wall 18. A pair of oppositely disposed leather straps 19 extends from the front wall 18 and are in spaced parallel relation to one another. Each of the straps 19 has a plurality of longitudinally spaced apertures within so as to engage in a corresponding buckle fitting 19A on the main body member 11. The hereinbefore described saddle bag 10 is well known within the art and is commercially available in pairs so as to be secured to a motorcycle (not shown).

Figure 2:
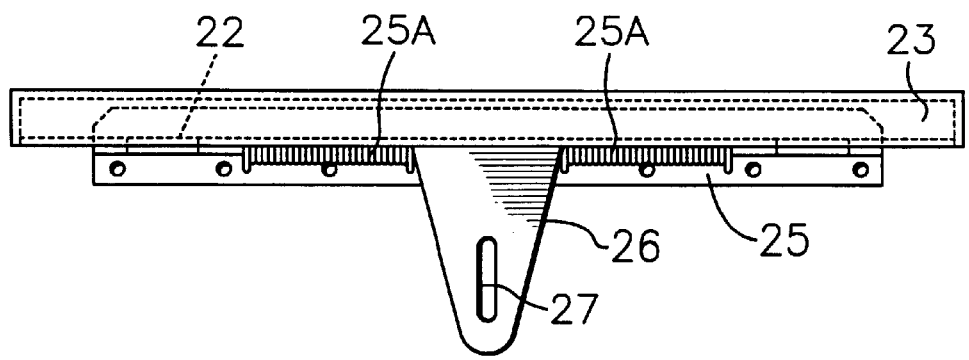
FIG. 2 is an enlarged front elevational view of the hinge lid portion of the invention.
Figure 3:
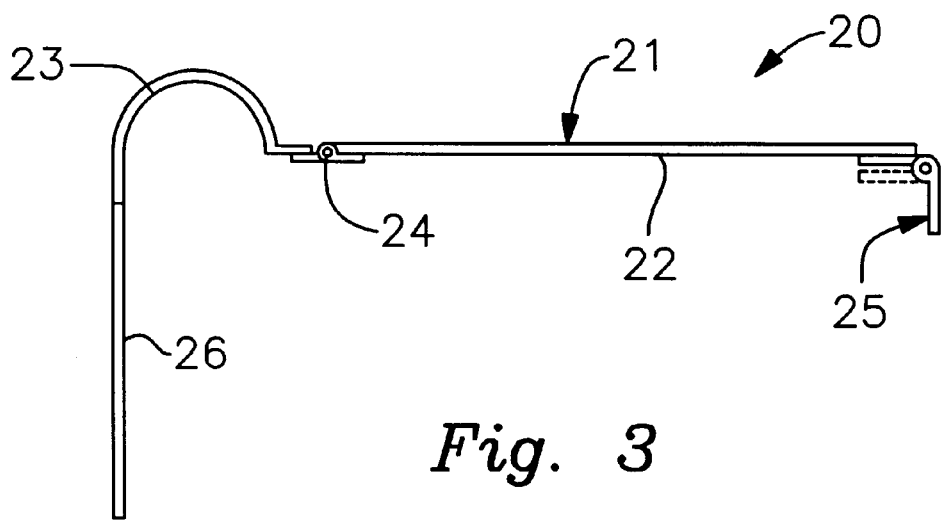
FIG. 3 is an enlarged end plan view.

A locking insert 20 of the invention, best seen in FIGS. 1–5 of the drawings has a rigid lid member 21 being of a generally rectangular shape defining a lid top 22, having a contoured front lip portion 23 that is pivotally connected to the lid top 22 by an interengaging hinge fitting 24. The lid member 21 is of a registering dimension with that of the saddle bag 10 main body member 11 rectangular opening at 14, best seen in FIG. 1 of the drawings. An elongated hinge fitting 25 with springs 25A is affixed to the lid top 22 in oppositely disposed spaced relation to the front lip portion 23 as best seen in FIG. 1 of the drawings. The hinge fitting 25 is correspondingly secure to a portion of the frame 13 adjacent the internal closure flap 15 as hereinbefore described. A hasp engagement tab 26 having an opening therein at 27 extends midway from the front lip portion 23 of the lid member 21 as best seen in FIGS. 1 and 2 of the drawings.

Figure 4:
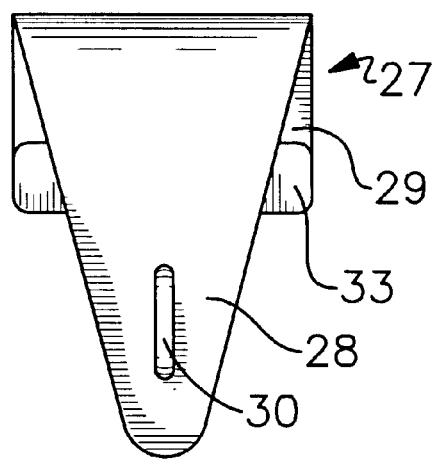
FIG. 4 is a front elevational view of a lock engagement bracket of the invention.
Figure 5:
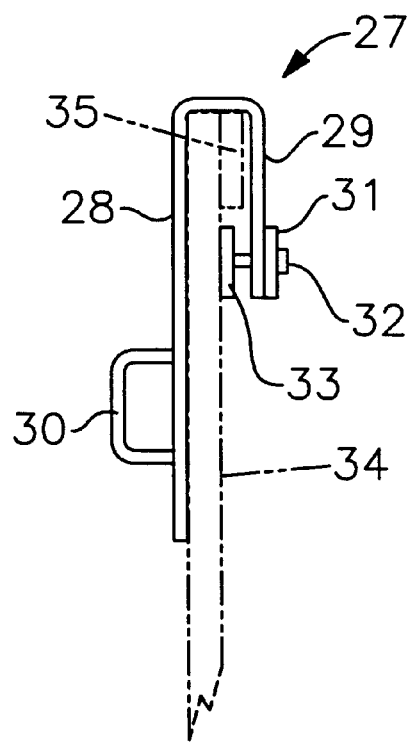
FIG. 5 is a side elevational view of the lock engagement bracket as seen in FIG. 4.
Figure 7:
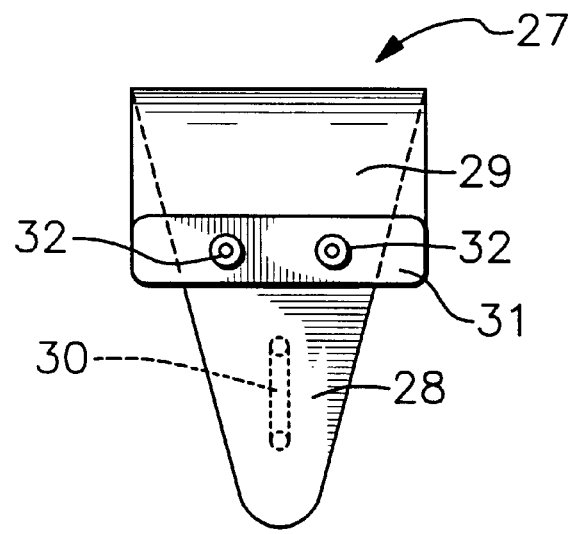
FIG. 7 is a rear elevational view of the lock engagement bracket of FIG. 4.

Referring now to FIGS. 4, 5 and 7 of the drawings, a hasp fitting 27 can be seen having a hasp portion 28 and an attachment portion 29. A hasp portion 28 has a hasp bar 30 extending outwardly therefrom. The attachment portion 29 is integral with the hasp portion defining a depending engagement area therebetween.

An apertured mounting element 31 is secured to the attachment portion 29 having a pair of set screws 32 extending therethrough. A bag engagement bracket 33 is independently positioned between the respective hasp portion 28 and attachment portion 29 to engage the front wall 34 of the main body member 11. In use, the set screws 32 are threadably advanced against the bracket 33 securing the hasp fitting 27 to the front wall 34 in registering alignment with the hereinbefore described hasp engagement tab 26. It will be evident from the above description that the engagement bracket 33 is in vertical alignment with a front portion 35 of the mounting frame 13 shown in broken lines in FIG. 5 that extends along the front wall 34 of the main body member 11.

Figure 6:
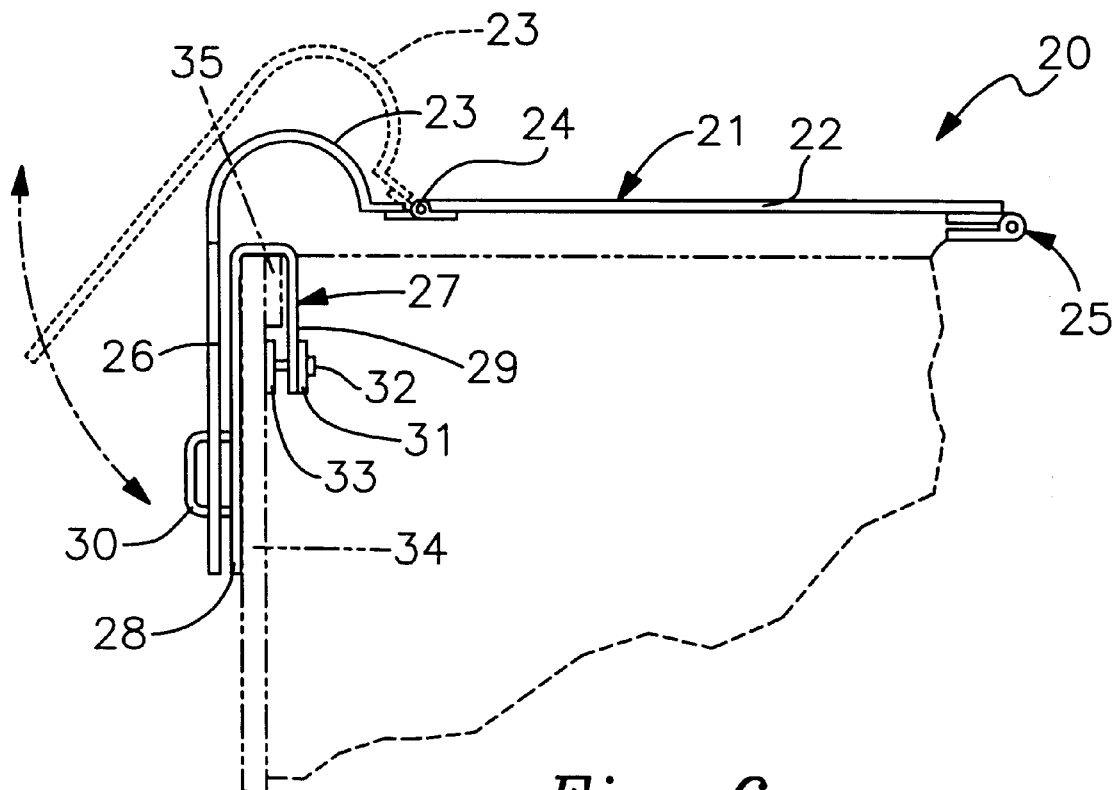
FIG. 6 is an enlarged end elevational view of the locking device in locked position on a saddle bag.

With the locking insert 20 of the invention secured within the opening at 14 defined by the main leather body member 11 and the support mounting frame 13, the lid member 21 can be closed and secured by pivoting the contoured lip portion 23, as shown in broken lines in FIG. 6 of the drawings, to engage the hasp engagement tab 26 over the hasp bar 30. A "pad" type lock (not shown) can be engaged through the hasp bar 30 securing the lid member 21 within the opening at 14. The closure flap 15 of the saddle bag 10 can then be hinged downwardly over the locked assembly secured by the hereinbefore described straps 19 and the respective buckle fittings 19A concealing the locking insert 20 of the invention.

It will be apparent to those skilled in the art that motorcycle bags mare typically sold in pairs and that the locking inserts 20 of the invention can be in one or both of the motorcycle bags as is desired by the user.

It will therefore be seen that a new and novel motorcycle saddle bag locking device has been illustrated and described and that various changes can be made therein without departing from the spirit of the invention.

We claim:

1. A locking device for use on motorcycle saddle bags that have a leather body member with an internal bag support frame and a closure flap, said motorcycle locking device comprises, a closure lid pivotally secured to a portion of said bag support frame, a contoured front lip pivotally secured to said closure lid, a hasp engagement tab extending from said lip, resilient hinge means pivotally securing said lid to said support frame, a hasp fitting removably secured to said leather bag body member overlying said bag support frame in spaced relation to said resilient hinge means and means for securing said hasp fitting to said bag and bag support frame.

2. The locking device set forth in claim 1 wherein said closure lid is made of metal.

3. The locking device set forth in claim 1 wherein said hasp fitting comprises, a hasp portion and a bag attachment portion, said bag attachment portion having an engagement bracket, means for selectively securing said engagement bracket to said leather body member.

4. The locking device set forth in claim 1 wherein said resilient hinge means comprises, an elongated hinge element and a pair of longitudinally spaced springs interengaged thereon.

5. The locking device set forth in claim 3 wherein said means for selectively securing said engagement bracket to said leather bag comprises, a pair of set screws threadably advanced from said bag attachment portion against said engagement bracket.

6. The locking device set forth in claim 1 wherein said contoured lip on said closure lid is movable from a first non-lock engagement position to a second locked engagement position in registration with said hasp fitting on said leather body member of said saddle bag.

\* \* \* \* \*